United States Patent
Allemand et al.

(10) Patent No.: US 9,463,489 B2
(45) Date of Patent: Oct. 11, 2016

(54) PROCESS FOR COATING A PART WITH AN OXIDATION-PROTECTIVE COATING

(75) Inventors: Alexandre Allemand, Arnozan (FR); Olivier Szwedek, Paris (FR); Luc Bianchi, Artannes sur Indre (FR); Yann Le Petitcorps, Leognan (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 658 days.

(21) Appl. No.: 13/881,136

(22) PCT Filed: Oct. 25, 2011

(86) PCT No.: PCT/EP2011/068657
§ 371 (c)(1),
(2), (4) Date: Sep. 18, 2013

(87) PCT Pub. No.: WO2012/055865
PCT Pub. Date: May 3, 2012

(65) Prior Publication Data
US 2014/0004271 A1    Jan. 2, 2014

(30) Foreign Application Priority Data
Oct. 25, 2010   (FR) .................................. 10 58711

(51) Int. Cl.
*B05D 5/00*     (2006.01)
*C04B 35/56*    (2006.01)
(Continued)

(52) U.S. Cl.
CPC ............. *B05D 5/00* (2013.01); *C04B 35/5622* (2013.01); *C04B 35/62834* (2013.01);
(Continued)

(58) Field of Classification Search
None
See application file for complete search history.

(56) References Cited

U.S. PATENT DOCUMENTS 3,241,956 A    3/1966   Inoue
3,250,892 A    5/1966   Inoue
(Continued)

FOREIGN PATENT DOCUMENTS

CN    102167623 A    8/2011
EP     2166601 A1    3/2010
(Continued)

OTHER PUBLICATIONS

Dahl, P., et al., "Densification and properties of zirconia prepared by three different sintering techniques", "Ceramics International", Sep. 12, 2006, pp. 1603-1610, vol. 33.
(Continued)

*Primary Examiner* — Shamim Ahmed
*Assistant Examiner* — Braford Gates
(74) *Attorney, Agent, or Firm* — Hultquist, PLLC; Mary B. Grant

(57) ABSTRACT

A method for preparing a protective coating against oxidation on at least one surface of at least one part made of at least one material capable of being oxidized, wherein the following successive steps are carried out:
  a) each of the particles of a powder made of a first ceramic selected from refractory ceramics and ceramics which resist oxidation, is coated with at least one layer selected from layers made of a refractory ceramic, layers made of a ceramic which resist oxidation, and layers made of a refractory metal, provided that the coating comprises at least one ceramic which resists oxidation, and at least one refractory ceramic or metal;
  b) the powder is deposited onto the surface to be coated of the part;
  c) sintering of the powder is achieved on the surface of the part by a Spark Plasma Sintering (SPS) Method;
  d) the part is cooled;
  e) the cooled part, coated on at least one of its surfaces with a protective refractory monolayer coating against oxidation, with a three-dimensional microstructure, is recovered.

36 Claims, 5 Drawing Sheets

(51) Int. Cl.

| | | |
|---|---|---|
| *C04B 35/628* | (2006.01) | |
| *C04B 35/645* | (2006.01) | |
| *C04B 41/00* | (2006.01) | |
| *C04B 41/45* | (2006.01) | |
| *C04B 41/52* | (2006.01) | |
| *C04B 41/87* | (2006.01) | |
| *C23C 24/08* | (2006.01) | |
| *C23C 26/00* | (2006.01) | |
| *C23C 28/04* | (2006.01) | |

(52) U.S. Cl.
CPC .. *C04B 35/62842* (2013.01); *C04B 35/62884* (2013.01); *C04B 35/62894* (2013.01); *C04B 35/62897* (2013.01); *C04B 35/645* (2013.01); *C04B 41/009* (2013.01); *C04B 41/0072* (2013.01); *C04B 41/4584* (2013.01); *C04B 41/52* (2013.01); *C04B 41/87* (2013.01); *C23C 24/08* (2013.01); *C23C 26/00* (2013.01); *C23C 28/04* (2013.01); *C04B 2235/3839* (2013.01); *C04B 2235/3843* (2013.01); *C04B 2235/5436* (2013.01); *C04B 2235/6562* (2013.01); *C04B 2235/6565* (2013.01); *C04B 2235/6567* (2013.01); *C04B 2235/666* (2013.01); *C04B 2235/77* (2013.01); *C04B 2235/80* (2013.01)

(56) References Cited

U.S. PATENT DOCUMENTS

| | | |
|---|---|---|
| 3,446,607 A | 5/1969 | Volk et al. |
| 3,503,118 A | 3/1970 | Criscione et al. |
| 3,775,137 A | 11/1973 | Clougherty et al. |
| 4,668,583 A | 5/1987 | Olander |
| 5,283,109 A | 2/1994 | Kaplan et al. |
| 5,614,162 A | 3/1997 | Gribkov et al. |
| 5,725,955 A | 3/1998 | Tawil et al. |
| 5,750,450 A | 5/1998 | Bull et al. |
| 5,922,486 A | 7/1999 | Chiao |
| 6,024,909 A * | 2/2000 | Yoshida .......... B22F 1/025 264/430 |
| 6,582,779 B2 | 6/2003 | Li et al. |
| 2002/0081396 A1 | 6/2002 | Li et al. |
| 2008/0090071 A1 | 4/2008 | Valle et al. |
| 2010/0129670 A1* | 5/2010 | Sun .......... C04B 41/86 428/432 |
| 2010/0139840 A1 | 6/2010 | Allemand et al. |
| 2013/0082421 A1 | 4/2013 | Allemand et al. |
| 2014/0004271 A1 | 1/2014 | Allemand et al. |

FOREIGN PATENT DOCUMENTS

| | | |
|---|---|---|
| FR | 1475529 A | 3/1967 |
| FR | 2716208 A1 | 8/1995 |
| FR | 2932496 A1 | 12/2009 |
| JP | 6135721 A | 5/1994 |
| JP | 2000-277127 A | 10/2000 |
| WO | 9313033 A1 | 7/1993 |
| WO | 2004083147 A1 | 9/2004 |
| WO | 2009099447 A1 | 8/2009 |

OTHER PUBLICATIONS

Li, J., et al, "Thompson Scientific", Jan. 1, 2011, pp. AN 2011-M14927, Volume Database WPI, No. XP-002679688.

Liu, B., et al., "La0.9Sr0.1Ga0.8Mg0.2O3-delta sintered by spark plasma sintering (SPS) for intermediate temperature SOFC electrolyte", "Journal of Alloys and Compounds", Mar. 31, 2007, pp. 383-389, vol. 458.

Munir, Z., et al., "The effect of electric field and pressure on the synthesis and consolidation of materials: A review of the spark plasma sintering method", "J. Mater. Sci.", Feb. 1, 2006, pp. 763-777, vol. 41.

Han, K., et al., "Rate of Oxidation of Carbon Fiber/Carbon Matrix Composites with Antioxidation Treatment at High Temperature", "J. Electrochem. Soc.: Sold-State Science and Technology", Apr. 1987, pp. 1003-1009, vol. 134, No. 4.

McKee, D., "Oxidation Behavior and Protection of Carbon/Carbon Composites", "Carbon", 1987, pp. 551-557, vol. 25, No. 4.

McKee, D., "Chapter 3: Oxidation Protection of Carbon Materials", "Chemistry and Physics of Carbon (Ed.: Thrower, P.)", May 23, 1991, pp. 173-321, vol. 23, Publisher: CRC Press.

\* cited by examiner

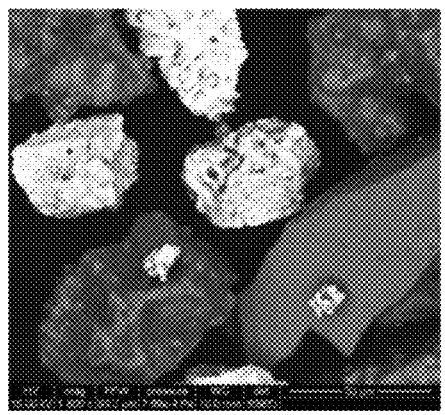
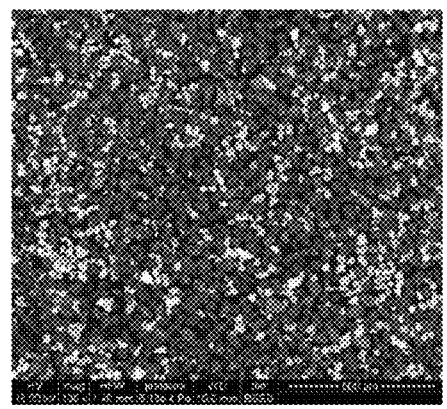
FIG.2A                FIG.2B
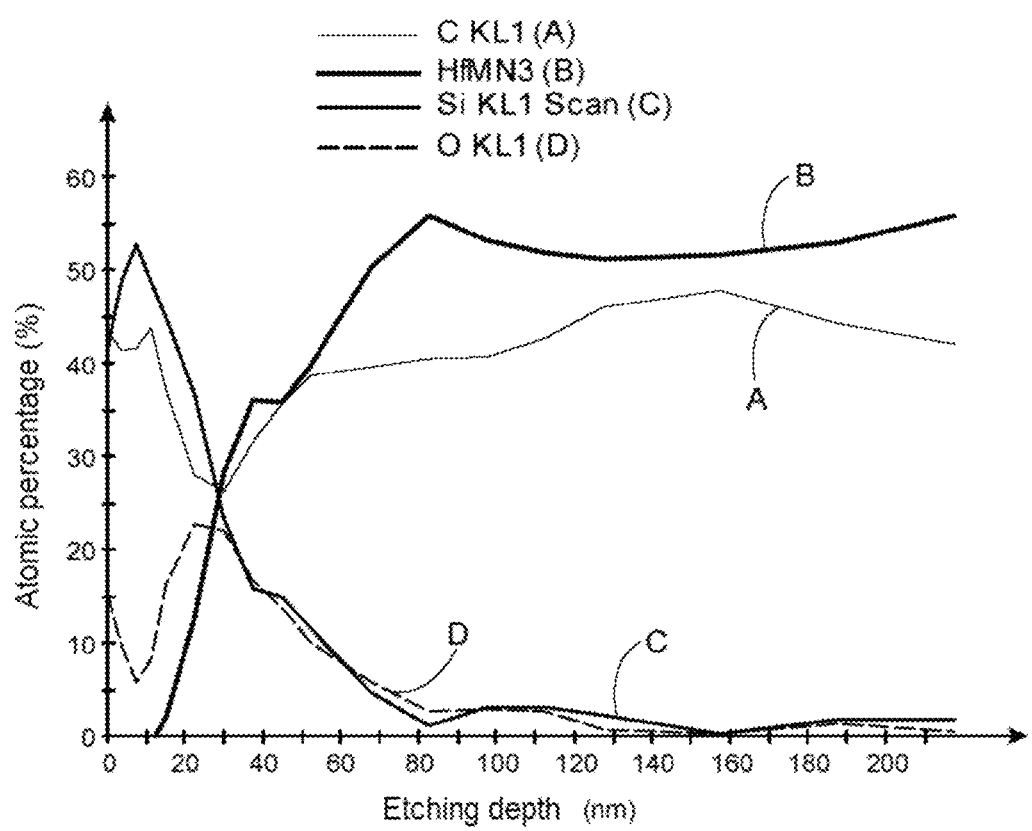
FIG.3

PROCESS FOR COATING A PART WITH AN OXIDATION-PROTECTIVE COATING

CROSS-REFERENCE TO RELATED APPLICATIONS

This application is a U.S. national phase under the provisions of 35 U.S.C. §371 of International Patent Application No. PCT/EP11/68657 filed Oct. 25, 2011, which in turn claims priority of French Patent Application No. 1058711 filed Oct. 25, 2010. The disclosures of such international patent application and France priority patent application are hereby incorporated herein by reference in their respective entireties, for all purposes.

TECHNICAL FIELD

The invention relates to a method for coating a part with a protective coating against oxidation (oxidation-protective coating).

More specifically, the invention relates to a method for coating at least one surface of at least one part made of at least one material capable of being oxidized, with a protective coating against oxidation.

The technical field of the invention may be generally defined as that of oxidation protection or PAO (Protection Against Oxidation).

The technical field of the invention is in particular that of protection against high temperature oxidation, generally at a temperature above 1,200° C. of materials sensitive to oxidation, such as composite materials and notably carbon/carbon composite materials.

BACKGROUND ART

Composite materials such as carbon/carbon composite materials (CIC) have been known for more than thirty years for their excellent resistance to temperature and their resistance to thermal shocks. They retain their breaking stress and their modulus at temperatures of more than 2,000° C. However, within the scope of prolonged use in an oxidizing medium, they rapidly lose any mechanical property and this from 400° C. This is why, for overcoming this major problem, about twenty years ago, composites with an SiC matrix and with C fibers were first of all developed and then with SiC fibers when the latter were available on the market. However, if SiC/SiC or C/SiC composites have better resistance to oxidation than C/C composites, they cannot be used at temperatures above 1,200° C.

Protective coatings against oxidation of materials based on C, and notably C/C composite materials, may be of various chemical natures.

Notably, a distinction is made between coatings based on noble metals, coatings based on phosphates; coatings based on boron oxide, on borates or borides; coatings based on carbides.

We shall first of all examine coatings based on noble metals.

Among noble metals, iridium is of particular interest as a protection against oxidation (PAO), because of its high melting temperature (2,440° C.) and of its very low permeability to oxygen up to about 2,100° C.

During the 60's, iridium was particularly studied within the scope of the space program of the United States [1]. The main problem which is posed upon using iridium in order to achieve PAO, is the extreme volatility of iridium oxides ($IrO_2$ and $IrO_3$).

Further, the coefficient of expansion difference between iridium and carbon makes it difficult to obtain an adherent PAO.

However, dense iridium deposits adhering to carbon have been obtained.

Thus, document [2] first of all describes a method comprising the deposition of a slurry of finely divided iridium powder on a graphite substrate, and then the heating of the coated graphite substrate to a temperature above 2,130° C. and for a sufficient time in order to obtain a coating made of melted iridium containing recrystallized graphite.

Document [3] describes a method for making an iridium coating on a graphite substrate, wherein a slurry of iridium powder is deposited on a graphite substrate, and the graphite substrate is then heated in order to produce by sintering an agglomerated iridium coating on this graphite substrate, this coating for example having a thickness of about 60 μm. It is then proceeded with depositing iridium in the vapor phase on the agglomerated iridium coating, for example by sublimation of carbonyl or chlorocarbonyl iridium in a carbon monoxide atmosphere under reduced pressure between 300° C. and 800° C. The thickness of the thereby achieved iridium deposit is for example of about 15 μm. Finally deposition by electro-plating of an iridium layer on the iridium deposited in the vapor phase is achieved.

It is possible to estimate the thickness of the final deposit as being about 100 μm.

The PAO prepared in document [3] was tested and it resists to oxidation in air, for example up to 2,000° C., for 10 minutes, without any degradation.

Moreover, according to document [1], the recession rate of iridium in air at 2,000° C. at atmospheric pressure is of about 150 μm/hour.

As a conclusion, the drawbacks of PAOs based on noble metals like iridium are mainly the cost, and the formation of volatile species, such as $IrO_2$ and $IrO_3$, which are highly unstable.

Another category of protective coatings against oxidation consists of coatings based on phosphates.

Enamels based on phosphates are often described in the literature, and notably in document [1], for protection of carbonaceous materials.

Document [4] describes a method for achieving protection against the oxidation of a product made of a composite material comprising carbon and having a ceramic surface wherein an external coating with a composition based on $P_2O_5$—$SiO_2$—$Al_2O_3$ is formed on the ceramic surface, and after drying, a heat treatment is performed at a temperature at least sufficient for transforming the external coating into an insoluble cement capable of forming a self-healing glass.

This type of protection based on phosphates is according to document [1], effective for temperatures ranging up to 1,000° C.

The main drawback of PAOs based on phosphates is that they only ensure protection at temperatures below 1,200° C.

Other PAO coatings are coatings based on boron oxide and on borates or borides.

Coatings based on zirconium boride ($ZrB_2$) are, according to document [1], effective for protecting over a very short time, graphite up to 2,200° C.

Boron oxide may also be used for ensuring cohesion of refractory particles such as $ZrB_2$, $HfB_2$ or $ZrSi_2$ in order to form an impervious coating at the surface of the material. After 10 hours in air at 1,200° C., a C/C composite coated with such a protection is, according to document [5], always entirely intact.

The main drawback of PAOs based on borates, borides, or boron oxides is that there is always formation of $B_2O_3$ which volatilizes from 1,200° C.

PAO coatings may also be based on carbides.

Silicon carbide (SiC) is very interesting for producing PAOs resistant to high temperatures, for example above 1,200° C., since it forms an oxide with the oxygen of the air, which, beyond 1300° C., has the lowest permeability to oxygen of all the oxides [1].

Further, under certain conditions of temperature and of $O_2$ partial pressure, SiC forms a glassy phase which gives the possibility, by topping the carbon, of blocking the pores and the possible cracks.

This PAO seems to be effective between 1,000° C. and 1,800° C. [1] depending on the oxygen partial pressure.

Chemical vapor deposition (CVD) is the means the most currently used for depositing SiC with a view to producing a PAO [1].

Document [6] describes parts made of refractory materials prepared by hot pressing of $TiB_2$, $ZrB_2$, $HfB_2$, $NbB_2$, $TaB_2$ powders or mixtures thereof and of 10% to 35% by volume of SiC. A preferred material is prepared by hot pressing of $ZrB_2$ and SiC powders. These materials have good resistance to oxidation, to thermal stresses, and to ablation, and have good mechanical integrity.

Document [7] relates to composite ceramic compositions which resist to high temperature ablation and which may notably be used for the outer thermal protection of spacecrafts such as space shuttles.

These compositions notably comprise mixtures of zirconium diboride and of zirconium carbide with silicon carbide, mixtures of hafnium diboride and of hafnium carbide with silicon carbide and mixtures of zirconium and hafnium diborides and/or carbides with silicon carbides.

These ceramics are prepared by sintering under pressure a mixture of powders at a temperature which generally ranges from 1,850° C. to 2,250° C.

Different compositions are tested under various heat flows.

The composition consisting of ZrC (20% by volume), $ZrB_2$ (16% by volume) and the remainder being SiC, has under a flux of 400 W/cm², under a pressure of 0.075 atm and at a temperature of 2,180° C., an ablation rate of 1.97 µm/min. This is the best result obtained in document [7], under a condition for active oxidation of SiC.

Document [8] describes a coating made of refractory carbide for a surface of a carbon substrate, subject to temperature and abrasion stresses, such as nozzle throats, turbine blades, heat shields and « hypersonic structures ».

The carbon substrate may be made of pyrolytic carbon or made of a carbon-carbon composite.

The coating is prepared by heating the substrate in a furnace in vacuo and by introducing a halide of a metal forming a carbide in the furnace. The metal forms a carbide with the carbon on a first portion of the surface of the substrate. Next, a hydrocarbon gas is added to the halide and a continuous layer of carbide is thereby formed on the first portion.

The preferred carbide is hafnium carbide HfC, but silicon carbide SiC, tantalum carbide TaC, zirconium carbide ZrC, and mixed carbides of silicon, tantalum or zirconium with hafnium are also mentioned.

This carbide layer resists to cracking and to spalling.

It should be noted that according to document [1], the most refractory carbide which is HfC, seems to protect the carbon up to 1,300° C.

Another technique also used for depositing carbide layers is the so-called « pack cementation » technique.

This technique, which is notably described in document [9], consists of preparing a mixture of a refractory metal (for example chromium) powder, of a metal oxide (for example alumina) and of a catalyst (for example ammonium chloride).

The mixture is then put into contact with the carbon part to be coated, and the assembly formed by the part and by the mixture is brought to a temperature of 1,000° C. under argon. The metal then reacts with the substrate in order to form a carbide layer.

The main drawback of PAOs based on carbides is that several carbides must mandatorily be associated in these PAOs.

Indeed, no carbide can by itself ensure resistance to a high temperature and low oxidation of the substrate.

Other further PAO coatings are multi-layer coatings.

Indeed, generally, a PAO consisting of a single chemical compound is inoperative at a high temperature, i.e. a temperature generally above 1,200° C.

Indeed, in order to overcome the problems of diffusion of oxygen, of compatibility with carbon, and of matching of the coefficients of expansion, it is preferable to produce a multi-layer or multi-sequence PAO.

Document [10] describes a refractory structure capable of prolongedly resisting to temperatures exceeding at least about 2,500° F. in an oxidizing environment which comprises a carbon-carbon composite substrate resistant to high temperatures and a coating resistant to high temperature oxidation (i.e. a PAO) formed in situ on the surface of the substrate and comprising alternating thin layers of SiC and of a carbide of a metal from Group IVB, such as HfC or ZrC. These alternating layers have a thickness from 1 to 10 µm and the total thickness of the PAO is from about 130 to 500 µm.

The layer in contact with the CIC is preferably SiC.

The making of these layers is ensured by chemical vapor deposition (CVD) at a temperature comprised between about 1,090° C. and 1,400° C. (more specifically at a temperature of about 1,198° C.) under a pressure comprised between about 6 mbars and 666 mbars (more specifically under a pressure of about 26 mbars).

The precursor of SiC is methyltrichlorosilane (MTS) and the one of HfC is hafnium tetrachloride obtained by flushing chlorine gas over hafnium metal at 510° C. The alternation of the layers is obtained by opening or cutting off the chlorine supply every 2 minutes.

The authors indicate that such a PAO efficiently protects a C/C for several hours at 1,760° C. For shorter protection times, the latter resists up to 1,930° C.

The preparation of multi-layer coatings is however long, complex and costly, it requires multiple steps and complicated apparatuses.

Besides, hot sintering technology with a pulsed electric field is known (Spark Plasma Sintering or SPS) also known under the name of « Field Activated Sintering Technique » or FAST.

The first patent applications [11], [12] concerning this technology were filed by K. INOUE at the end of the 60's.

But one had to wait until the end of the 1990s for an exponential increase in the number of patents and publications relating to the SPS technique. In Europe, the number of SPS machines actually increased only at the beginning of the early 2,000 s.

SPS is a sintering technique which consists of simultaneously applying on the solid or powdery sample to be densified, or on the part to be assembled, a uniaxial pressure and current pulses of high intensity which cause a rise in temperature of the sample.

The current is applied as trains of current pulses, for example with a period of 3.2 ms, the intensity of which may reach several thousand amperes, for example up to 8,000 A, or even 50,000 A.

The powders or parts may be made of metal, ceramics or polymers.

The current is applied to the sample via a circuit of graphite plates and pistons, the powder for example is inserted into the inside of a tabletting machine (pelletizer) made of graphite.

The assembly consisting of the tabletting machine, the pistons and the plates is the only circuit in the vacuum chamber for which temperature rises.

More exactly, the principle of the operation of an SPS apparatus and of its main units is illustrated in FIG. 1. The powder (1) is placed in a graphite sleeve (2), between two pistons (3). Pressure (4) is applied to these pistons (3), and a DC current (5) is applied to electrodes (6). The powder (1), the pistons (3), the graphite sleeve (2) and a portion of the electrodes (6) are placed inside a vacuum chamber (7). Instead and in place of the powder, it is possible to place between both pistons two ceramic parts to be assembled so as to have in the matrix the piston-first ceramic-second ceramic-piston succession.

The temperature is tracked via an optical pyrometer which also controls the electric power injected into the assembly. As this was already mentioned above, the currents used during sintering may range up to 50,000 A.

The main benefit of « SPS » technology is the possibility of densifying the samples in relatively short times of the order of a few minutes, for example from 5 to 10 minutes.

The rapidity of sintering often gives the possibility of minimizing the growth of grains and of attaining for certain materials a density close to 100%.

The use of the « SPS » for preparing a coating for the PAO has neither been described nor suggested in the prior art as it has been studied above.

Indeed, this study from the prior art mainly discloses three types of methods for preparing a PAO coating, which are:
 the methods in which a slurry is prepared and deposited on the substrate, and then conventional sintering is carried out. These methods are notably illustrated by document [4];
 the methods in which a mixing of powders is carried out followed by hot compression sintering. These methods are notably illustrated by document [7];
 the chemical vapor deposition (CVD) methods.

Considering the foregoing, there exists a need for a method for preparing a protective coating against oxidation (oxidation-protective coating) on a part made of a material which may be oxidized, this coating being a monolayer coating giving protection against oxidation at high temperatures, for example above 1,200° C.

In other words there exists a need for a method for preparing a monolayer protective coating against oxidation, which is also refractory, or even highly refractory.

In particular, there exists a need for a method for preparing a monolayer coating which ensures effective protection against oxidation, at high temperatures, of parts made of carbon-carbon composite materials.

Further there exists a need for such a method which is simple, reliable, rapid, inexpensive and which gives the possibility of obtaining a dense, quality coating, and as far as possible, free of cracks.

The goal of the invention is to provide a method for preparing a protective coating against oxidation on at least one surface of at least one part made of at least one material which may be oxidized, which i.a. meets this need and which does not have the drawbacks, defects, limitations and disadvantages of the methods of the prior art and which solves the problems of the methods of the prior art.

SUMMARY OF THE INVENTION

This goal, and further other ones, are achieved, according to the invention, by a method for preparing a protective coating against oxidation on at least one surface of at least one part made of at least one material capable of being oxidized, in which the following successive steps are carried out:

a) each of the particles of a powder made of a first ceramic selected from refractory ceramics and ceramics which resist oxidation is coated with at least one layer selected from layers made of a refractory ceramic, layers made of a ceramic which resists oxidation, and layers made of a refractory metal, provided that the coating and the particles comprise at least one ceramic which resists oxidation, and at least one refractory ceramic or refractory metal;

b) the powder is deposited onto the surface to be coated of the part;

c) sintering of the powder is carried out on the surface of the part by a Spark Plasma Sintering Method (hot sintering process with a pulsed electric field);

d) the part is cooled down preferably to room temperature;

e) the cooled part coated on at least one of its surfaces with a refractory monolayer coating for protection against oxidation with a three-dimensional microstructure is recovered.

By room temperature, is generally meant a temperature from 15° C. to 30° C., preferably from 20° C. to 25° C.

Advantageously, during step c), sufficient pressure is applied to the part, and simultaneously a sufficient pulsed electric current is applied to said part, in order to raise the temperature of the part up to a sufficient temperature for causing sintering of the powder on the surface of the part, and then application of the electric current and of pressure is stopped simultaneously.

Advantageously, during step c), a pressure from 0.01 to 500 MPa is applied to said part, and simultaneously a pulsed electric current of an intensity from 1 to 50,000 A is applied to said part in order to raise the temperature of the part up to a temperature, a so-called plateau temperature, comprised between 1,000° C. and 2,500° C.

Advantageously, the material capable of being oxidized is selected from materials based on carbon such as carbon/carbon composite material; ceramics such as boride ceramics like $HfB_2$, carbide ceramics except for SiC, like TiC, ZrC, and HfC, nitride ceramics such as TiN and ZrN; composite ceramics such as SiC/SiC composites; ultra-refractory metals such as W or Ta; and carbon/ceramic composites such as C/SiC composites.

In a first embodiment, during step a), the first ceramic may be a refractory ceramic and each of the particles of the powder of the first ceramic is coated with a first layer made of a second ceramic which is a ceramic which resists to oxidation, different from the first ceramic.

In a second embodiment, during step a), the first ceramic is a ceramic which resists oxidation and each of the particles of the powder of the first ceramic is coated with a first layer made of a second ceramic which is a refractory ceramic, different from the first ceramic.

Advantageously, in these first and second embodiments, the first layer of the second ceramic may further be coated, whether this is a refractory ceramic or a ceramic which resists oxidation, with a second layer made of a refractory metal.

In a third embodiment, during step a), the first ceramic is a ceramic which resists oxidation, and each of the particles of the first ceramic is coated with a first layer made of a refractory metal.

Advantageously, in this third embodiment, the first layer made of a refractory metal may further be coated with a second layer made of a ceramic which is a ceramic which resists oxidation in the case when the first ceramic is a refractory ceramic or which is a refractory ceramic in the case when the first ceramic is a ceramic which resists oxidation.

In the three embodiments, provision may further be made for one or several other layer(s), for example made of a refractory ceramic, made of a ceramic which resists oxidation or made of a refractory metal, on the second layer, two successive layers being of different nature.

Advantageously, the powder made of a first ceramic, for example made of a first refractory ceramic, has an average grain size from 1 nm to 1,000 µm.

Generally, according to the invention, the ceramic which resists oxidation is different from the refractory ceramic.

Generally, the first ceramic which constitutes the particles is different from the second ceramic which constitutes the first layer which coats each of the particles.

Advantageously, the refractory ceramic is selected from oxide ceramics, nitride ceramics, boride ceramics, carbide ceramics; mixtures thereof (preferably with each other); and composite ceramics thereof (preferably with each other).

Advantageously, the ceramic which resists oxidation is selected from among carbide ceramics, nitride ceramics, boride ceramics, oxide ceramics; mixtures thereof (preferably with each other); and composite ceramics thereof (preferably with each other); the ceramic which resists oxidation being different from the refractory ceramic.

Preferably, the refractory ceramic is selected from carbides, nitrides, borides and oxides of transition metals from the IVb, Vb, and VIb columns of the Periodic Table of the Elements; the mixtures of several of said carbides, nitrides, borides and oxides of transition metals of the IVb, Vb and VIb columns of the Periodic Table of the Elements with each other, and the mixtures of one or several of said carbides, nitrides, borides and oxides of the transition metals of the IVb, Vb and VIb columns of the Periodic Table of the Elements and of SiC (with generally a minority proportion by mass of SiC); the composite ceramics of said carbides, nitrides, borides and oxides of transition metals of the IVb, Vb, and VIb columns of the Periodic Table of the Elements with each other, and the composite ceramics of one or several of said carbides, nitrides, borides and oxides of transition metals of the IVb, Vb and VIb columns of the Periodic Table of the Elements and of SiC (with generally a minority proportion by mass of SiC).

Preferably, the ceramic which resists oxidation is selected from among the various carbides, nitrides, borides and oxides different from the refractory ceramics defined above, for which it has been seen that they were selected from among carbides, nitrides, borides and oxides of transition metals of the IVb, Vb, and VIb columns of the Periodic Table of the Elements (i.e. the ceramic which resists oxidation is selected from the carbides, nitrides, borides and oxides of the elements which are not transition metals of the IVb, Vb, and VIb columns of the Periodic Table of the Elements); mixtures thereof (preferably with each other); and composite ceramics thereof (preferably with each other).

Still preferably, the refractory ceramic is selected from metal carbides HfC, ZrC, TiC, TaC, and WC; mixtures of said metal carbides with each other, and mixtures of one or several of said metal carbides with SiC (with generally a minority proportion by mass of SiC); composite ceramics of said metal carbides with each other, and composite ceramics of one or several of said metal carbides with SiC (with generally a minority proportion by mass of SiC).

Still preferably, the ceramic which resists oxidation is selected from SiC and composite ceramics of SiC (generally with a majority proportion by mass of SiC).

Advantageously, the layer of the second ceramic has a thickness from 1 nm to 1,000 µm.

Advantageously, the refractory metal is selected from among Ti, Cr, Nb, V, Ta, Ir, Mo, Hf, Zr, Pt, Re; their alloys; and mixtures of these metals and/or alloys.

Advantageously, the layer made of a refractory metal has a thickness from 1 nm to 1,000 µm.

Advantageously, during step b), the powder is deposited with a process selected from plasma spraying, processes using a suspension of the powder or slurry, and simply putting the powder in contact via a dry route.

It is important to note that this step does not correspond to a sintering step but to simple preliminary shaping of the powder.

This step ensures that the powder is adapted to the shape, even a complex shape, of the surface of the part to be coated, which proves to be highly interesting in the case of parts with complex shapes to be coated.

Advantageously, a pressure from 10 to 150 MPa, preferably from 20 to 100 MPa, better from 50 to 75 MPa is applied.

Advantageously, a pulsed electric current with an intensity from 1 to 50,000 A, preferably from 1,000 to 3,000 A is applied.

Advantageously, the plateau temperature is from 1,400° C. to 2,000° C., preferably from 1,600° C. to 1,950° C., for example 1,950° C.

Advantageously, the plateau temperature may be maintained for a period from 0 to 10 minutes, preferably from 0 to 7 minutes, for example 5 minutes.

Advantageously, the total duration of the method may be from 10 to 30 minutes, notably 20 minutes.

Advantageously, the part is cooled at a rate from 5° C. to 600° C./min, for example 40° C./min, preferably down to room temperature.

Advantageously, the pressure and the temperature are gradually raised from room temperature and from a pressure of 0 MPa.

Preferably, the temperature may be raised by using one ramp or several ramps optionally having different slopes, in order to reach the sintering temperature.

Advantageously, said ramp(s) has(have) a slope from 25° C. to 400° C./min, for example 100° C./min.

Advantageously, the pressure is raised by carrying out one ramp or several ramps optionally having different slopes, in order to reach the sintering pressure.

Advantageously, said ramp(s) has(have) a slope from 1 MPa/min to 20 MPa/min, preferably from 5 to 10 MPa/min.

Advantageously, the temperature and the pressure may be raised simultaneously within a same period of time.

Advantageously, several pressure ramps and several temperature ramps are carried out, the corresponding pressure and temperature ramps having the same duration.

Advantageously, the pulsed electric current may be applied in the form of pulses from 1 to 5 ms, for example with a period of 3.3 ms, assembled by trains of 1 to 15, for example of 12 pulses, each train being separated by from 1 to 15 periods, for example by 3 periods.

Advantageously, the protective refractory monolayer coating against oxidation has a thickness from 4 nm to 1,000 µm, preferably from 10 nm to 600 µm.

The method according to the invention is fundamentally distinguished from methods for preparing a protective coating against oxidation of the prior art such as those which have been mentioned above.

The method according to the invention has a specific sequence of specific steps which has never been described in the prior art.

Indeed, the method according to the invention applies a single powder, which may be described as a coated powder, consisting of particles of a powder made of a first ceramic, these particles being coated with at least one layer selected from ceramic layers and refractory metal layers.

The powder applied in the method according to the invention consists for example of the particles of a powder made of a first refractory ceramic coated with a layer made of a second ceramic which resists oxidation, different from the first ceramic, and not a mixture of powders such as for example in document [7].

As this has already been mentioned above, this powder may be directly placed on the material to be coated or else applied as a slurry or else projected by plasma spraying, this with the purpose of coating parts with complex shapes.

Next, the method according to the invention achieves sintering of the specific powder with an « SPS» process. The use of the « SPS» technique for achieving such sintering of such a powder and preparing a PAO coating, which furthermore is a refractory PAO coating, has never been described nor suggested in the prior art.

The method according to the invention, because it uses a single specific powder, sintered by a specific « SPS » method, gives the possibility for the first time of preparing a monolayer coating having a specific structure which is a three-dimensional microstructure.

This coating having this specific structure provides, while only consisting of one single layer, a protection against oxidation which is efficient at high temperature, while hitherto, it was necessary to resort to a multilayer coating in order that the protection against oxidation be as efficient at high temperature, i.e. generally above 1,200° C.

The method according to the invention includes a limited number of steps, simple and easy to apply.

The method according to the invention is much simpler, much less lengthy, and much less expensive than a method for preparing a multilayer coating.

As a summary, the method according to the invention does not have the drawbacks, defects, limitations and disadvantages of the method of the prior art and provides a solution to the problems of the methods of the prior art.

Notably, the method according to the invention relatively to the three main types of methods for PAO preparation mentioned above, has the following advantages:
  it is easy to apply;
  it allows dense deposits to be obtained;
  the obtained deposits have a particular microstructure, for example with refractory particles individually surrounded by a ceramic having good resistance to oxidation.

The coating obtained by the method according to the invention is a protective coating against oxidation, is refractory, or even highly refractory, non-cracked, and dense, for example with a density greater than or equal to 94%, or even greater than or equal to 96%, in particular when the powder comprises one or several additional layers made of a refractory metal.

In other words, the method according to the invention may be defined as a method in which a specific powder is prepared first of all, for example by coating a refractory ceramic powder with a coating having good resistance to oxidation, or vice versa (i.e. when a powder having good resistance to oxidation for example an SiC powder is coated with a coating consisting of a refractory ceramic layer, for example an HfC layer), and then the specific coated powder is sintered directly on the material to be protected with a specific sintering method which is sintering with a pulsed electric field.

This method surprisingly and for the first time allows direct co-sintering of the protection against oxidation on the material to be protected.

The protective coating against oxidation obtained by this method has a specific three-dimensional microstructure, combining resistance to oxidation with an ultra-refractoriness; this original microstructure is inherently due to the method which was used for preparing it, which applies a specific « composite» powder and a specific sintering method.

It is not possible to obtain this unique specific three-dimensional microstructure with a method other than the method of the invention, for example by chemical vapor deposition (CVD), since, as shown in document [10], chemical vapor deposition can only produce a stack of layers in two dimensions (2D).

It may be stated that the PAO coating obtained with the method according to the invention with a three-dimensional microstructure synergistically combines two advantageous properties, i.e. refractoriness and resistance to oxidation.

Further in other words, the method for preparing a PAO coating according to the invention consists of directly sintering on the part to be protected, a specific powder consisting for example, according to the first embodiment, of a refractory core, for example made of HfC, coated with a layer having good resistance to oxidation, for example an SiC layer, itself optionally coated with a metal, for example titanium, layer.

It was actually shown on a C or C/C substrate that such a PAO coating sintered under a pulsed electric field was dense (density greater than or equal to 94%, or even 96%) and non-cracked.

The obtained microstructure is three-dimensional and allows total insulation of the refractory ceramic, for example of the refractory carbide, such as HfC, sensitive to oxygen, with a compound, such as SiC, which is less oxidizable.

Or else, the method according to the invention consists, according to the second embodiment, of directly sintering on the part to be protected, a powder consisting of a core having a good resistance to oxidation, coated with a refractory layer, itself optionally coated with a metal, for example titanium, layer.

When the substrate is made of a material such as a C/C composite material, the method according to the invention gives the possibility of combining with the thermostructural properties of the composites, an efficient protection against oxidation at a high temperature, i.e. generally above 1,200° C.

Other characteristics and advantages of the invention will become better apparent upon reading the description which follows, given as an illustration and not as a limitation with reference to the appended figures wherein:

BRIEF DESCRIPTION OF THE DRAWINGS

FIGS. 2A and 2B show micrographs made with a scanning electron microscope (SEM), obtained with back-scattered electrons, of the HfC powder coated with SiC prepared in Example 1. The scale illustrated in FIG. 2A is 30 µm and the scale illustrated in FIG. 2B is 500 µm;

FIG. 3 is a graph which shows the results of an Auger spectroscopy analysis of a grain of the HfC powder coated with SiC prepared in Example 1, said grain being a grain where the SiC deposit is not visible with a scanning electron microscope.

The depth of the etching (in nm) is plotted in abscissae and the atomic percentage (%) is plotted in ordinates.

The curves A, B, C, D represent the respective concentrations of C, Hf, Si and O.

Figure 4:
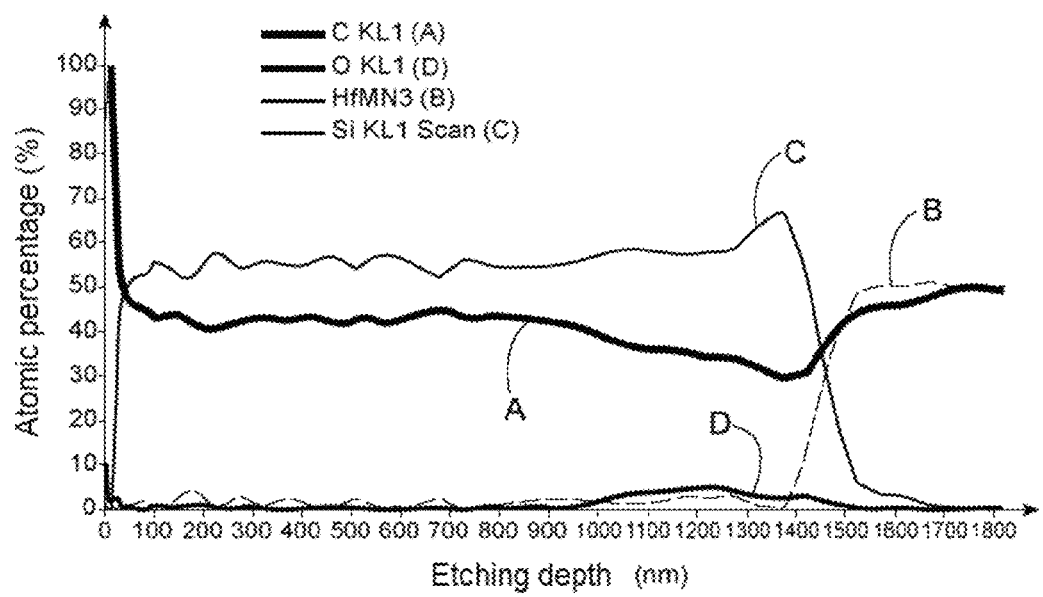

FIG. 4 is a graph which shows the results of an Auger spectroscopy analysis of a grain of the HfC powder coated with SiC prepared in Example 1, said grain being a grain where the SiC deposit is visible in a scanning electron microscope.

The depth of the etching (in nm) is plotted in abscissae and the atomic percentage (%) is plotted in ordinates.

The curves A, B, C, D represent the respective concentrations of C, Hf, Si and O.

Figure 5:
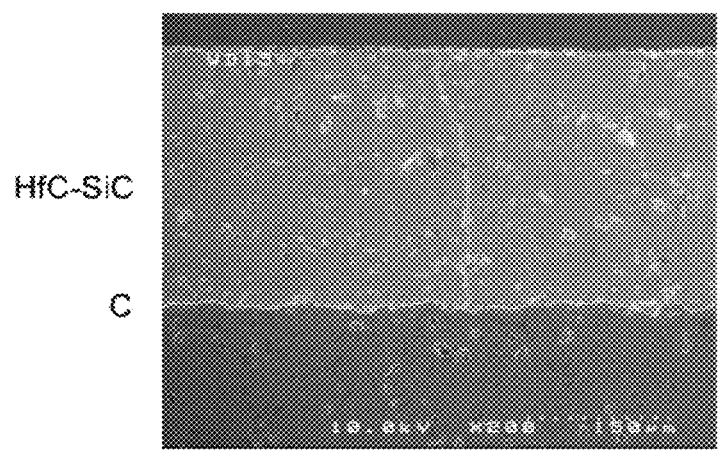

FIG. 5 is a micrograph made with a scanning electron microscope (SEM) of the sample prepared in Example 1, in which an HfC powder coated with SiC has been sintered on a carbonaceous substrate by «SPS» at 1,950° C. The micrograph of FIG. 5 was made with a magnification of 200, and the illustrated scale in FIG. 5 is 150 µm.

Figure 6:
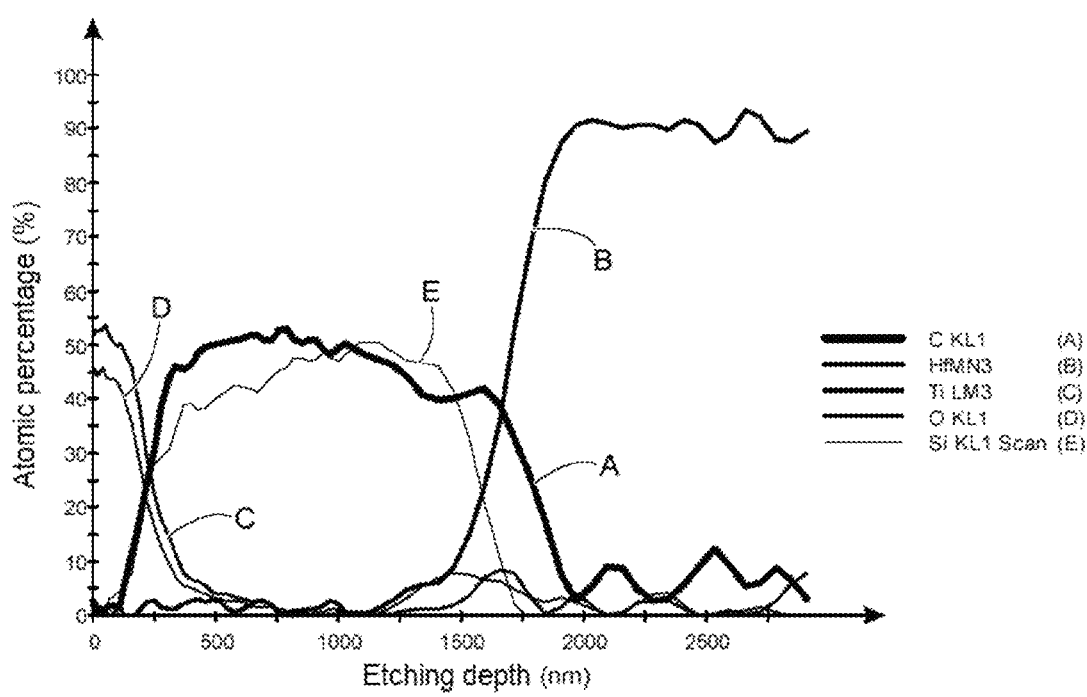

FIG. 6 is a graph which shows the Auger spectroscopy analysis of a grain of the HfC powder coated with SiC coated with titanium as prepared in Example 1.

The etching depth (in nm) is plotted in abscissae and the atomic percentage (%) is plotted in ordinates.

The curves A, B, C, D and E represent the respective concentrations of C, Hf, Ti, O, and Si.

Figures 7A, 7B, 7C:
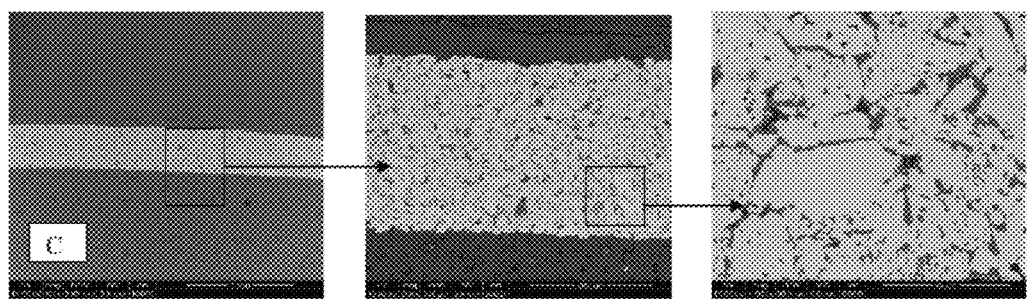

FIGS. 7A, 7B and 7C show micrographs made with a scanning electron microscope (SEM), obtained with back-scattered electrons, of the sample prepared in Example 2, in which an HfC powder coated with SiC coated with titanium was sintered on a carbon substrate by «SPS» at 1,950° C., in order to form a PAO on said substrate.

The micrograph of FIG. 7A was made with a magnification of 50, and the scale represented in FIG. 7A is 1 mm.

The micrograph of FIG. 7B was made with a magnification of 200, and the scale represented in FIG. 7B is 300 µm.

The micrograph of FIG. 7C was made with a magnification of 1,500, and the scale represented in FIG. 7C is 40 µm.

Figure 8:
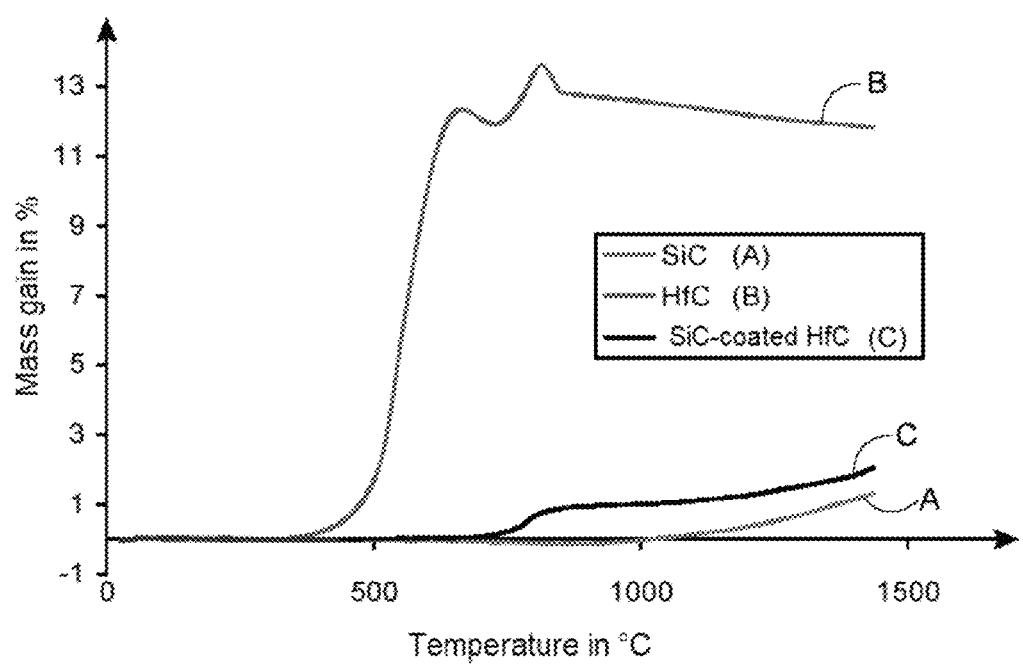

FIG. 8 is a graph which shows the results of differential thermogravimetric analyses made on a crude SiC powder, without any coating (curve A), on a crude HfC powder, without any coating (curve B), and on the HfC powder coated with SiC prepared in Example 1 (curve C).

The temperature (in ° C.), is plotted in abscissae, and the mass gain (in %) is plotted in ordinates.

DETAILED DISCUSSION OF PARTICULAR EMBODIMENTS

In the following description, the first preferred embodiment of the method according to the invention will be more particularly described, however the man skilled in the art may easily adapt the information provided in the following to the other preferred embodiments of the method according to the invention.

In this first preferred embodiment, during step a), the first ceramic is a refractory ceramic and each of the particles of the powder of the first ceramic is coated with a first layer made of a second ceramic which is a ceramic which resists oxidation, different from the first ceramic.

By «refractory ceramic», is generally meant a ceramic which has a sintering temperature above 1,300° C.

The first refractory ceramic may be selected from oxide ceramics, nitride ceramics, boride ceramics, carbide ceramics, mixtures thereof and composite ceramics thereof.

Advantageously, the first refractory ceramic is selected from metal carbides such as HfC, ZrC, TiC, TaC, WC; mixtures thereof, i.e. mixtures of several of said metal carbides with each other, and mixtures of one or several of said metal carbides and of SiC (generally with a minority proportion by mass of SiC); and the composite ceramics of said metal carbides, i.e. the composite ceramics of several of said metal carbides with each other, and the composite ceramics of one or several of said metal carbides and of SiC (with generally a minority proportion by mass of SiC).

The first ceramic may even be described as an «ultra-refractory» ceramic.

Such an ultra-refractory ceramic generally has a sintering temperature above 1,300° C.

An example of such an ultra-refractory ceramic is HfC.

The powder made of a first refractory ceramic generally has an average grain size from 1 nm to 1,000 µm, preferably from 3 µm to 50 µm.

The second ceramic is a ceramic which resists oxidation, in other words which has good resistance to oxidation.

By «ceramic which resists oxidation», is generally meant a ceramic which has a low mass loss or mass gain in the presence of a partial pressure of oxygen and of temperature.

This low mass loss or mass gain in the presence of a partial pressure of oxygen and of temperature changes according to the ceramics and may be determined by the man skilled in the art.

For example, HfC alone, under oxidation, rapidly transforms from 400° C. into $HfO_2$ which is porous with a mass gain.

On the other hand, SiC passivates by forming at its surface a liquid $SiO_2$ (glass) layer which is a barrier to the diffusion of oxygen, and SiC is therefore protected by its $SiO_2$ layer.

In the case of SiC which resists oxidation well, there is therefore a mass variation but which is very small as compared with that of HfC.

A more accurate definition may therefore be the following: a carbide, nitride or boride ceramic which resists oxidation well, is a ceramic which, treated in air at temperatures comprised between 400° C. and the melting or decomposition temperature of this ceramic, has at its surface an associated passivating oxide layer (for example $SiO_2$ for SiC) which prevents or slows down any diffusion of oxygen towards the ceramic.

The second ceramic may generally be selected from carbide ceramics, nitride ceramics, boride ceramics, oxide ceramics, (it is possible to devise a coating of HfC with $SiO_2$ for example); mixtures thereof; and composite ceramics thereof.

Among carbide ceramics, mention may for example be made of SiC.

Further it is advantageous to select as a second ceramic, a ceramic which exhibits thermodynamic equilibrium with the first ceramic regardless of the temperature.

The man skilled in the art, possibly resorting to data available in the literature will be able to easily determine for a first given ceramic, the second ceramics which fulfill these conditions of thermodynamic equilibrium.

As an example, the coated powder may be a powder of an ultra-refractory ceramic, for example HfC, coated with SiC which has good resistance to oxidation and thermodynamic equilibrium with HfC regardless of the temperature, for example between 500° C. and 2,850° C.

Generally, the layer of the second ceramic (whether it is refractory or resistant to oxidation) has a thickness of 1 nm to 1,000 µm, preferably from 10 nm to 10 µm.

In order to coat the particles of the powder made of the first refractory ceramic, with the layer of the second ceramic which resists oxidation, it is possible to use any technique with which a layer may be deposited with the desired thickness, and notably with the thickness specified above. These techniques should preferably give the possibility of obtaining homogeneous, thin and adherent deposits.

Among these techniques, mention may be made of the chemical vapor deposition technique (CVD), in particular the chemical vapor deposition technique in a fluidized bed, the sol-gel technique, the freeze-drying technique.

The man skilled in the art will be able to select the adequate precursors for making the deposits with CVD. As an example, a precursor of SiC is hexamethyldisilane.

Advantageously, the layer of the second ceramic may further be coated with a layer made of a refractory metal, in other words the powder applied in the method according to the invention may also have, in addition to the coating of the second ceramic as described above, a refractory metal coating.

By « refractory metal », is generally meant a metal which has a sintering temperature above 1,000° C.

By « ultra-refractory metal », is generally meant a metal which has a sintering temperature above 1,600° C.

The refractory metal may be selected from Ti, Cr, Nb, V, Ta, Ir, Mo, Hf, Zr, Pt, Re; alloys thereof, and mixtures of these metals and/or alloys.

Advantageously, the layer made of a refractory metal has a thickness from 1 nm to 1,000 µm, preferably from 10 nm to 3 µm.

The optional layer made of a refractory metal is generally deposited with a technique similar to the one used for depositing the layer of the second ceramic, for example with CVD. The man skilled in the art will be able to select the adequate precursors for carrying out metal depositions with CVD.

The refractory metal layer i.a. gives the possibility of facilitating sintering (of the powder particles with each other), and ensures adhesion with the substrate. In the case of substrates based on carbon, and notably substrates made of a carbon/carbon (C/C) composite, this additional refractory metal layer further forms « in fine » a refractory carbide by carburization with carbon, notably with the carbon of the C/C composite.

A preferred powder comprises refractory or even ultra-refractory ceramic particles for example of HfC, coated with a ceramic layer having good resistance to oxidation, for example an SiC layer, this layer being in turn covered with a layer of refractory metal, for example a titanium layer.

Depending on the targeted applications, the man skilled in the art may easily select the suitable ceramic layer and the optional metal layer. The powder of the first ceramic may receive a large variety of second ceramic layers and optionally of metal layers.

On the layer made of refractory metal, it is further possible to deposit other layers, for example from 1 to 100 layers selected from ceramic layers, for example made of refractory ceramic or made of ceramic which resists oxidation, and refractory metal layers.

Generally in the coating of the particles, two successive layers are of a different nature.

The description which was made above relating to the nature of the refractory ceramic, of the ceramic which resists oxidation, and of the refractory metal; to the grain size of the first powder, the thicknesses of the layers; the layer deposition techniques etc., is applied mutatis mutandis to the other embodiments.

For example, the thickness of a metal layer is located in the range given above, regardless of whether this layer is for example the first or the second.

According to the invention, it is then proceeded with the deposition of the powder on the surface of the part with any adequate method.

The powder may thus be deposited with a method selected from plasma spraying, methods using a suspension of the powder or slurry, or further by simply putting the powder via a dry route in direct contact with the surface to be coated.

The deposition of the powder by dipping the part in a slurry or by plasma projection of the powder is well adapted to parts with a complex shape.

It is then proceeded with sintering of the thereby prepared powder, on the surface of a part to be coated with a PAO coating.

According to the invention, the part to be coated is generally made of a material capable of being oxidized.

By material « capable of being oxidized» ("which may be oxidized") or « material sensitive to oxidation », is generally meant in the sense of the invention, a material for which the mass loss or mass gain is significant after a heat treatment in the presence of oxygen as opposed to a material, such as a ceramic, which resists oxidation as this was defined above notably in connection with the concept of forming a passivating layer.

The material which may be oxidized is generally selected from carbon-based materials such as carbon/carbon composite materials; ceramics such as boride ceramics like $HfB_2$, carbide ceramics except for SiC like TiC, ZrC, and HfC, nitride ceramics such as TiN and ZrN; composite ceramics such as SiC/SiC composites; ultra-refractory metals such as W or Ta; and carbon/ceramic composites such as C/SiC composites.

By « material based on carbon », is generally meant a material which comprises more than 50%, preferably more than 80%, still more preferably more than 90% by mass of carbon, better 100% by mass of carbon.

The part to be coated may have any shape and size, however provided that it may be placed in an « SPS » machine.

According to the invention, this sintering is carried out by the «SPS» technique.

Indeed, it was shown according to the invention that it was possible by applying the «SPS» technique to directly co-sinter the powder on the material to be protected.

Figure 1:
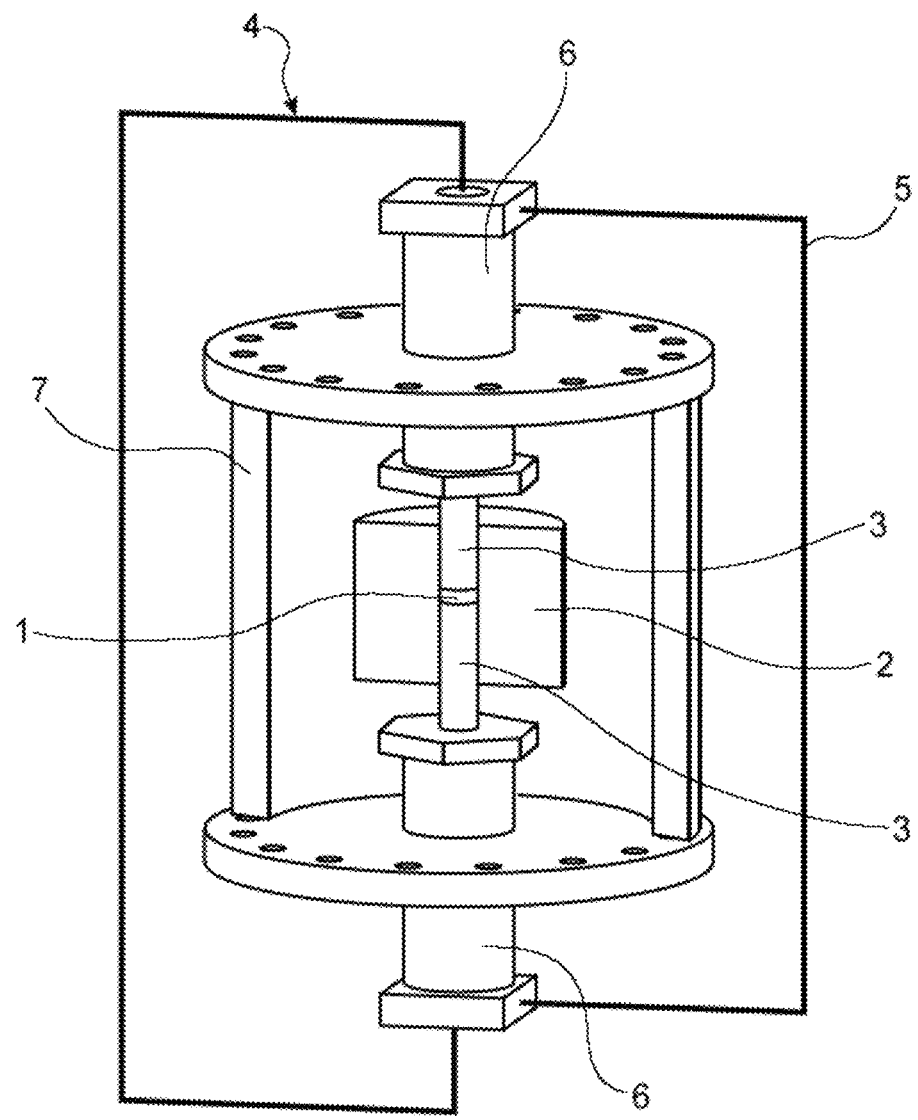
FIG. 1 is a schematic vertical sectional view of an exemplary SPS apparatus for applying the method according to the invention.

The method according to the invention is generally applied in a conventional Spark Plasma Sintering (SPS) device, machine, such as for example the one described in FIG. 1.

One generally begins by placing the part inside the matrix, tabletting machine (pelletizer), graphite sleeve of the «SPS» device, machine, and then the powder prepared as this was described above, is directly placed on the surface to be coated of the part.

Generally, flexible graphite such as the product marketed under the trade name of PAPYEX® by Carbone Lorraine is placed between the powder and the pistons.

The tabletting machine (pelletizer), matrix, graphite sleeve and the pistons are then placed in the SPS machine.

A sufficient pressure is applied onto said part, and simultaneously, a sufficient pulsed electric current is applied to said part in order to raise the temperature of the part up to a sufficient temperature for causing sintering of the powder on the surface of the part.

In other words, when everything is in contact (tabletting machine, pistons, parts), an electric current may be generated in order to generate the rise in temperature. Generally, the maximum amperage which a matrix may support is notably related to its diameter. Thus, for a sample diameter of 8 mm, 2,000 A may be applied without any risk of deteriorating the matrix. For larger diameters such as 20 mm, 4,000 A or more may be applied.

The applied pulsed electric current is generally from 1 A to 50,000 A in order to generate a rise in temperature up to a temperature (plateau temperature) comprised between 1,000° C. and 2,500° C. The pressure which is applied at the same time corresponds to an applied force from 0.01 MPa to 500 MPa.

Preferably, the applied pressure according to the invention is generally from 1 to 200 MPa and the applied intensity is preferably from 500 to 8,000 A. Preferably, the pressure is from 10 to 150 MPa, more preferably from 20 to 100 MPa, better from 50 to 75 MPa.

Still preferably, the intensity is from 500 to 6,000 A, more preferably from 1,000 to 3,000 A.

The pressure and intensity values are selected within the ranges above so that the temperature of the powder (and/or of the substrate) rises to a temperature (plateau temperature), allowing sintering of the powder on the surface of the part/substrate, such a temperature is generally from 1,000° C. to 2,500° C., preferably from 1,400° C. to 2,000° C., more preferably from 1,600° C. to 1,950° C., for example 1,950° C.

The duration during which said temperature (also called a plateau temperature) for example 1,950° C., is maintained, a duration which may be also designated as a plateau duration or time, is generally from 0 to 10 minutes, preferably from 0 to 7 minutes, for example 5 minutes.

When the plateau time is equal to 0, this means that a rise in temperature is carried out up to the maximum temperature and that one proceeded with cooling down to room temperature without observing any plateau.

It will be noted that this plateau duration is in any case very short, with regard to the other sintering methods.

Also, the cycle time apart from cooling, and the total, overall duration of the full cycle with cooling, are reduced.

This cycle time is for example from 10 to 30 minutes, notably from 20 to 22 minutes only, and the duration of the full cycle is of about one hour, which is another advantage of the method according to the invention.

It is important to control the lowering of the temperature and pressure in order to avoid cracking of the PAO coating.

Cooling of the coated part is generally carried out in a not too sudden way as the man skilled in the art may understand in this technical field. Thus, a cooling rate from 1 to 600° C. per minute, for example from 10 to 100° C./min will generally be observed from the temperature plateau.

Preferably, the cooling is carried out with successive ramps having different slopes, thus cooling may be for example carried out as follows: 45° C./min from the plateau temperature to 600° C.; and then cooling depending on the inertia of the machine from 600° C. to room temperature.

It is obvious for the man skilled in the art that the temperature-pressure cycle should be optimized for each type of powder applied. On the other hand, regardless of the ascents, descents or durations of the temperature and pressure plateaus, the simultaneity of the temperature and pressure is absolutely necessary for proper sintering of the powder.

Advantageously, the temperature and therefore intensity, and pressure (or applied force, the pressure depending on the supporting surface according to the well known relationship $P=F/S$) parameters are not from room temperature and a pressure of 0 MPa suddenly, instantaneously applied, but are gradually raised from room temperature and from a pressure of 0 MPa.

For temperature (governed by the intensity), a gradual arise will thus preferably be achieved with a ramp, or several ramps optionally having different slopes, in order to reach the maximum temperature as mentioned above, further called a plateau or sintering temperature.

Said temperature ramp(s) has(have) preferentially a slope from 50° C. to 200° C./min, for example 100° C./min.

For pressure, a gradual arise may be advantageously achieved in the same way with a ramp, or several ramps optionally having different slopes, in order to reach the maximum pressure indicated above, further called a plateau or sintering pressure.

Said pressure ramp(s) has(have) generally a slope from 1 MPa/min to 20 MPa/min, preferably from 5 to 10 MPa/min.

The rise in temperature and the rise in pressure, regardless of whether they are gradual or not, are preferably ensured simultaneously, concomitantly within a same period of time.

If several pressure ramps and several temperature ramps are achieved, the corresponding pressure and temperature ramps preferably have the same duration.

By applying the temperature (and therefore the intensity) and/or pressure (and therefore the applied force) parameters in a gradual way and not in a sudden instantaneous abrupt way, one thereby avoids submitting the part, notably the refractory ceramic part to too strong stresses, and no breaking of the part is reported.

In a particularly surprising way, it was shown by the inventors that the results were better and the obtained sintering of even better quality if the pressure (or force) required for achieving sintering was only applied after a significant rise in temperature from room temperature, generally up to a temperature allowing the surface of the part and the powder to be softened, to be softer, under the effect of this temperature. This way of proceeding is in particular applied to the case when the outer layer of the powder is either made of metal or made of SiC.

This temperature at which softening of the powder or of the surface of the part occurs, is a temperature which is less than the plateau, sintering temperature, as defined above, but which should be sufficient for allowing said softening; generally, this temperature is lower by 50° C. to 300° C., preferably by 100° C. to 250° C., more preferably by 150° C. to 200° C., than the plateau, sintering temperature defined above.

The softening of the surfaces in contact under the effect of the temperature allows better behavior of the surfaces during sintering.

For example, in the case when said plateau temperature is 1,950° C., the temperature of the powder and of the part is gradually raised up to about 1,850° C., preferably with two successive temperature ramps, and the pressure (force) applied to the parts is also gradually raised so that the pressure (or plateau pressure) allowing effective sintering of the powder on the surface of the part, i.e. a pressure of 75 MPa (for an applied force of 13.2 kN on a surface to be coated with a diameter of 15 mm), is only applied when the temperature of the parts reaches 1,850° C.

As an example, a rise in temperature from room temperature (generally 20° C. to 25° C.) up to 1,950° C., may be carried out in the following way:

from room temperature to 300° C.: about 1 to 2 minutes;
from 300° C. to 600° C.: 3 minutes;
from 600° C. to 1,850° C.: 12 minutes;
from 1,850° C. to 1,950° C.: 2 minutes;
a plateau at 1,950° C. for 5 minutes;
cooling from 1,950° C. to 600° C.: 30 minutes;
cooling from 600° C. to room temperature: a duration conditioned by the thermal inertia of the machine, for example from 10 minutes to 30 minutes.

During the same time, the pressure develops in the following way:

from 0 to 5.3 kN 25 MPa: rise in 1 minute;
plateau at 5.3 kN 25 MPa: for 15 minutes;
from 5.3 kN 25 MPa to 13.2 kN 75 MPa: rise in 1 minute;
plateau at 13.2 kN 75 MPa: for 5 minutes;
descent, decrease, from 13.2 kN 75 MPa to 0 kN: 30 minutes.

The substrate has a diameter of 15 mm and the applied forces of 5.3 kN and of 13.2 kN respectively correspond to pressures of 15 MPa and 75 MPa.

The gradual rises in temperature and in pressure described above, notably in the preferred embodiment of the temperature rises, (where an intermediate heating is applied up to a softening temperature), mentioned above, surely gives the possibility of avoiding resorting to an additional thermal step, as this is the case in the prior art, in order to obtain definitive sintering, and thus of directly obtaining in a single step the sintering of the powder on the surface, and of further additionally improving the quality of the obtained coating.

Further, it would seem that the geometry of the current pulse «trains» also has an influence on the quality of the obtained coating.

The current is applied in the form of series, trains of pulses; each series, train, consists of a determined and adjustable number of pulses. The series (trains) are separated from each other by a period of time during which the applied current is zero.

In the method according to the invention, 1 to 5 ms pulses are generally used, for example with a period of 3.3 ms, generally assembled as a train of 1 to 15, for example 12 pulses, each train being generally separated with 1 to 15 periods, for example 3 periods, of a duration (such as 3.3 ms) above, without any current.

It is possible to change these values but the current should always keep the same geometry: i.e. more or less numerous pulse trains separated by variable periods without any current.

The applied voltage is of a few volts, generally from 1 to 8 volts, preferably from 2 to 7 volts, typically 5 volts.

At the end of cooling, generally down to room temperature, for example from 20° C. to 25° C., the part provided with its PAO coating is recovered in the «SPS» apparatus.

The method according to the invention finds its application in all fields where it is desired to produce protective coatings against oxidization which are dense and highly refractory on surfaces of parts.

The method according to the invention allows elaboration of protective coatings against oxidation in fields as diverse as aeronautics, aerospace, chemical industry, and generally in all fields where very high temperatures are encountered.

In all these fields, preparation of protections against oxidation, which are dense and highly refractory, was not hitherto achievable.

The invention will now be described with reference to the following examples, given as an illustration and not as a limitation.

EXAMPLES

In these examples, two protective coatings against oxidation (PAO) are prepared with the method according to the invention, on carbonaceous substrates.

A first protective coating against oxidation (PAO) is prepared by «SPS» sintering of a hafnium carbide (HfC) powder coated with silicon carbide (SiC), on a carbonaceous substrate.

A second protective coating against oxidation (PAO) is prepared by «SPS» sintering of a hafnium carbide (HfC) powder coated with silicon carbide (SiC), coated with titanium (Ti), on a carbonaceous substrate.

The carbonaceous substrates are graphite pellets.

The «SPS» apparatus used is an apparatus of the «SPS 2080» type marketed by SYNTEX®.

Example 1

In this example, a protective coating against oxidation (PAO) is prepared by «SPS» sintering of a hafnium carbide (HfC) powder coated with silicon carbide (SiC), on a carbonaceous substrate.

The HfC powder coated with SiC is prepared from an initial HfC powder which has a $d_{50}$ of 35 µm.

The SiC coating of the powder is achieved by chemical vapor deposition (CVD) in a fluidized bed.

Hexamethyldisilane is used as a precursor of SiC for promoting deposition of SiC on the HfC powder.

The deposition operation is carried out under hydrogen (which plays a transport and reduction role) and under nitrogen (which plays the role of a fluidization gas) at about 900° C.

The deposition operation lasts for about 1 day taking into account the rise and the decrease of the temperature.

One of the benefits of the HfC powder coated with SiC stems from the fine adjustment between the coefficients of expansion of SiC, of HfC and of the substrate.

The benefit of SiC is to protect the hafnium carbide from oxidation at low temperature.

The photographs of the powder made with an SEM, obtained by back-scattered electrons (see FIGS. 2A and 2B), and the energy spectrometry analysis (Energy Dispersive Spectrometry or EDS), show the existence of two types of grains: the darkest grains are covered with SiC while the other paler grains only show the presence of HfC and an SiC coating is not visible.

These SEM observations are completed with Auger spectroscopy analysis which shows that in the case of a grain where the SiC deposit is not visible with the SEM (see FIG. 3), the thickness of the SiC deposit is of about 30 nm.

On the other hand (see FIG. 4), in the case when the SiC deposit is visible with the SEM, its thickness is of about 1,500 nm.

The hafnium carbide (HfC) powder coated with silicon carbide (SiC) prepared as described above, was sintered by «SPS» in the apparatus mentioned above, on a carbonaceous substrate as described above, and under the following conditions:

Pulse train: 3.3 ms.
Rise in temperature from 300° C. to 600° C. within 3 minutes, i.e. at a rate of 100° C./min;
Rise in temperature from 600° C. to 1,850° C. within 12 minutes, i.e. at a rate of 105° C./min;
Rise in temperature from 1,850° C. to 1,950° C. within 2 minutes, i.e. at a rate of 50° C./min;
A plateau at 1,950° C. for 2 minutes and under 75 MPa;
Decrease in temperature from 1,950° C. to room temperature: this cooling is conditioned by the thermal inertia of the system.

Characterization of the prepared protective coating against oxidation (PAO).

Visual observation.

The obtained coating has good cohesion. Visual observation does not reveal any defect.

Destructive control: Observation with a Scanning Electron Microscope.

An observation with the scanning electron microscope of the PAO coating on the carbonaceous substrate is achieved after cutting and polishing. FIG. 5 shows a micrograph of the coating, obtained by SEM on polished surfaces after metallographic preparation.

In FIG. 5 it may be seen that the deposit is not very cracked. The cracks are fine but cross the whole height of the layer.

Measurement of the density by hydrostatic weighing:
This measurement is carried out according to the following procedure:
Note the dry mass;
Put the sample in water;
Apply vacuum for several hours;
Note the mass in water as well as the mass of the wet sample;
By means of the buoyancy, the density, the open and closed porosity of the material is inferred therefrom.

This measurement has shown a density of the deposit of the order of 94%.

Example 2

In this example, a protective coating against oxidation (PAO) is prepared by «SPS» sintering of a hafnium carbide (HfC) powder coated with silicon carbide (SiC), coated with Ti, on a carbonaceous substrate.

The hafnium carbide (HfC) powder coated with silicon carbide (SiC), coated with Ti, is prepared by coating with titanium the hafnium carbide (HfC) powder coated with silicon carbide (SiC) prepared in Example 1.

The titanium carbide coating is made by chemical vapor deposition (CVD) in a fluidized bed.

The precursor used is titanium chloride, associated with a complexing agent.

The Ti layer with which the particles of the powder prepared in this example are provided, have a double benefit, i.e.:
the titanium layer gives the possibility of facilitating sintering;
during sintering, the titanium may carburize upon contact with the carbonaceous substrate so as to form TiC, a refractory carbide, and promote adhesion of the coating to the substrate.

Auger spectroscopy analysis of the thereby prepared powder (FIG. 6) shows a relatively small titanium thickness, of the order of 100 nm to 200 nm.

The SiC layer has a thickness from about 1,000 nm to 1,200 nm.

The hafnium carbide (HfC) powder coated with silicon carbide (SiC), coated with titanium, prepared as described above, was sintered by «SPS» in the apparatus mentioned above, on a carbonaceous substrate as described above, and under the following conditions:

a temperature of 1,950° C. for 5 minutes and under 75 MPa;
pulse train: 3.3 ms.
Rise in temperature from 300° C. to 600° C. within 3 minutes, i.e. at a rate of 100° C./min;
Rise in temperature from 600° C. to 1850° C. within 12 minutes, i.e. at a rate of 105° C./min;
Rise in temperature from 1,850° C. to 1,950° C. within 2 minutes, i.e. at a rate of 50° C./min;
A plateau at 1,950° C. for 2 minutes and under 75 MPa;
Cooling from 1,950° C. to 600° C. within 30 minutes, i.e. at a controlled cooling rate of 45° C./min;
Decrease in temperature from 600° C. to room temperature: this cooling is conditioned by the thermal inertia of the system.

During this «SPS» sintering operation, particular care was taken with the temperature of application of the pressure and with the cooling ramp.

The temperature cycle has already been described in detail above.

Simultaneously with the temperature cycle, the observed pressure cycle during the sintering operation by SPS is the following:
from 0 to 25 MPa: rise within 1 minute;
a plateau at 25 MPa: for 15 minutes;
from 25 MPa to 75 MPa: rise within 1 minute;
a plateau at 75 MPa: for 5 minutes;
decrease from 75 MPa to 0 MPa: 30 minutes.

Destructive control: Observation with the scanning electron microscope.

An observation with the scanning electron microscope of the PAO coating is carried out on the carbonaceous substrate, after cutting and polishing. FIGS. 7A, 7B and 7C show micrographs of the coating, obtained with back-scattered electrons, on polished surfaces after metallographic preparation.

FIGS. 7A, 7B and 7C show the microstructure of the PAO coating obtained on the carbonaceous substrate at different scales, more specifically at increasing magnifications of 50, 200 and 1,500 respectively for FIGS. 7A, 7B and 7C.

It may be seen in FIGS. 7A, 7B and 7C, that the deposit with a thickness of 500 µm is not cracked.

A few porosities, located at the grain boundaries are present. These porosities are due to the large grain size of the initial powder ($d_{50}$=35 µm) responsible for imperfect contact between the grains.

With back-scattered electrons (micrographs of FIGS. 7A, 7B and 7C), it is possible to observe a darker phase, homogeneously distributed at the grain boundaries.

Measurement of the density by hydrostatic weighing.

The measurement is conducted while observing the procedure already described above.

This measurement showed a density of the deposit of the order of 96%.

Analysis with diffraction of back-scattered electrons (Electron Backscatter Diffraction or EBSD).

By EBSD analysis, the darker phase, observed with the SEM, mentioned above, was identified as being SiC.

This same EBSD analysis did not give the possibility of finding any trace of the titanium. However, the presence of titanium allows better densification of the deposit (which is 96% with titanium versus 94% without titanium in Example 1).

Example 2 shows that it is possible to obtain an HfC/SiC PAO with a three-dimensional microstructure and which perfectly fits to the substrate, without any crack, with a carbonaceous substrate.

Example 3

In this example, thermogravimetric analyses (TGA) were conducted on the crude HfC powder (powder without any coating as described in Example 1) as well as on the HfC powder coated with SiC (prepared in Example 1) and on an SiC powder with a grain size $d_{50}$=35 µm identical with the previous ones.

The analyzer is a thermobalance more exactly a monofurnace SETARAM TG 92® apparatus equipped with a thermocouple of type S.

With sweeping of dry compressed air, the samples are positioned in a rod for Differential Scanning Calorimetry or DSC.

The maximum temperature reached is 1,500° C. and the rise kinetics are set to 10° C./min.

FIG. 8 shows the time-dependent change of the mass gain versus temperature.

The mass gain is directly linked to oxidation, the greater the mass gain, the more the material is oxidized.

FIG. 8 shows a mass gain of more than 10% for crude HfC (Curve B) with oxidation which starts from 400° C. and which is disastrous between 500 and 600° C.

On the other hand, as expected, the SiC (Curve A) is very little oxidized (about 1%). The HfC powder coated with SiC (Curve C) is hardly more oxidized than the SiC (about 1.5%). This result shows that with a thickness of SiC comprised between 30 and 1,500 nm (Example 1), the HfC is perfectly protected against oxidation and this for relatively long durations since TGA lasts for 2 hours 30 minutes.

REFERENCES

[1] D. W. Mc Kee, Chemistry and Physics of Carbon, Vol. 23, 173 (1991).
[2] U.S. Pat. No. 3,503,118.
[3] FR-A-1475529.
[4] WO-A-93/013033.
[5] D. W. McKee, Carbon, 25, 551 (1987).
[6] U.S. Pat. No. 3,775,137.
[7] U.S. Pat. No. 5,750,450.
[8] U.S. Pat. No. 4,668,583.
[9] K. H. Han, J. Electrochem. Soc. 134, 1003 (1987).
[10] R. B. Kaplan et al., U.S. Pat. No. 5,283,109 (1994).
[11] U.S. Pat. No. 3,241,956.
[12] U.S. Pat. No. 3,250,892.

The invention claimed is:

1. A method for preparing a protective coating against oxidation on at least one surface of at least one part made of at least one material capable of being oxidized, wherein the following successive steps are carried out:
   a) each of the particles of a powder made of a first ceramic selected from refractory ceramics and ceramics which resist oxidation is coated with at least one layer selected from layers made of a refractory ceramic, layers made of a ceramic which resists oxidation, and layers made of a refractory metal, provided that the coating and the particle comprise at least one ceramic which resists oxidation, and at least one refractory ceramic or metal;
   b) the powder is deposited onto the surface to be coated of the part;
   c) sintering of the powder is achieved on the surface of the part by a Spark Plasma Sintering (SPS) method;
   d) the part is cooled;
   e) the cooled part, coated on at least one of its surfaces with a protective refractory monolayer coating against oxidation, with a three-dimensional microstructure, is recovered.

2. The method according to claim 1, wherein, during step c), a sufficient pressure is applied to the part, and simultaneously a sufficient pulsed electric current is applied to said part, in order to raise the temperature of the part up to a sufficient temperature for causing sintering of the powder on the surface of the part, and then simultaneously, application of the electric current and of the pressure is stopped.

3. The method according to claim 2, wherein the pulsed electric current is applied in the form of pulses with a period of 1 to 5 ms assembled as trains from 1 to 15 pulses, each train being separated by 1 to 15 periods.

4. The method according to claim 2, wherein, during step c), a pressure from 0.01 MPa to 500 MPa is applied to said part, and simultaneously a pulsed electric current with an intensity from 1 to 50,000 A is applied to said part so as to raise the temperature of the part up to a temperature, hereafter referred to as a plateau temperature, comprised between 1,000° C. and 2,500° C.

5. The method according to claim 4, wherein the plateau temperature is maintained for a period of time from 0 to 10 minutes.

6. The method according to claim 1, wherein the material capable of being oxidized is selected from materials based on carbon; ceramics; composite ceramics; ultra refractory metals; and carbon/ceramic composites.

7. The method according to claim 6, wherein the materials based on carbon are carbon/carbon composite materials; the ceramics are boride ceramics, carbide ceramics except for SiC, and nitride ceramics; the composite ceramics are SiC/SiC composites; the ultra refractory metals are W and Ta; and the carbon ceramic composites are C/SiC composites.

8. The method according to claim 7, wherein the boride ceramic is $HfB_2$; the carbide ceramics are TiC, ZrC, and HfC; and the nitride ceramics are TiN and ZrN.

9. The method according to claim 1, wherein, during step a), the first ceramic is a refractory ceramic and each of the particles of the powder of the first ceramic is coated with a first layer made of a second ceramic which is a ceramic which resists oxidation, different from the first ceramic.

10. The method according to claim 9, wherein the first layer of the second ceramic is further coated with a second layer made of a refractory metal.

11. The method according to claim 10, wherein one or several other layer(s) is (are) provided on the second layer, two successive layers being of different nature.

12. The method according to claim 9, wherein the layer of the second ceramic has a thickness from 1 nm to 1,000 µm.

13. The method according to claim 1, wherein, during step a), the first ceramic is a ceramic which resists oxidation and each of the particles of the powder of the first ceramic is coated with a first layer made of a second ceramic which is a refractory ceramic, different from the first ceramic.

14. The method according to claim 13, wherein the first layer of the second ceramic is further coated with a second layer made of a refractory metal.

15. The method according to claim 14, wherein one or several other layer(s) is (are) provided on the second layer, two successive layers being of different nature.

16. The method according to claim 13, wherein the layer of the second ceramic has a thickness from 1 nm to 1,000 µm.

17. The method according to claim 1, wherein, during step a), the first ceramic is a ceramic which resists oxidation, and each of the particles of the first ceramic is coated with a first layer made of a refractory metal.

18. The method according to claim 17, wherein, the first layer made of a refractory metal is further coated with a second layer made of a ceramic which is a ceramic which resists oxidation in the case when the first ceramic is a refractory ceramic, or which is a refractory ceramic in the case when the first ceramic is a ceramic which resists oxidation.

19. The method according to claim 18, wherein one or several other layer(s) is (are) provided on the second layer, two successive layers being of different nature.

20. The method according to claim 1, wherein the powder made of a first ceramic has an average grain size from 1 nm to 1,000 µm.

21. The method according to claim 1, wherein the ceramic which resists oxidation is different from the refractory ceramic.

22. The method according to claim 1 wherein the refractory ceramic is selected from oxide ceramics, nitride ceramics, boride ceramics, carbide ceramics; mixtures thereof; and composite ceramics thereof.

23. The method according to claim 22, wherein the refractory ceramic is selected from carbides, nitrides, borides and oxides of transition metals of the columns IVb, Vb and VIb of the Periodic Table of the Elements; mixtures of several of said carbides, nitrides, borides and oxides of transition metals of the columns IVb, Vb, and VIb of the Periodic Table of the Elements, with each other, and mixtures of one or several of said carbides, nitrides, borides and oxides of transitions metals of the columns IVb, Vb and VIb of the Periodic Table of the Elements and of SiC; composite ceramics of said carbides, nitrides, borides and oxides of transition metals of the columns IVb, Vb and VIb of the Periodic Table of the Elements, with each other, and composite ceramics of one or several of said carbides, nitrides, borides and oxides of transition metals of the columns IVb, Vb and VIb of the Periodic Table of the Elements and of SiC.

24. The method according to claim 23, wherein the refractory ceramic is selected from metal carbides, HfC, ZrC, TiC, TaC, and WC; mixtures of said metal carbides with each other and mixtures of one or several of said metal carbides with SiC; composite ceramics of said metal carbides with each other, and composite ceramics of one or several of said metal carbides with SiC.

25. The method according to claim 1, wherein the ceramic which resists oxidation is selected from carbide ceramics, nitride ceramics, boride ceramics, oxide ceramics; mixtures thereof; and composite ceramics thereof; wherein the ceramic which resists oxidation is different from the refractory ceramic.

26. The method according to claim 25, wherein the ceramic which resists oxidation is selected from carbides, nitrides, borides and oxides different from the carbides, nitrides, borides and oxides of transition metals of the columns IVb, Vb and VIb of the Periodic Table of the Elements; mixtures thereof; and composite ceramics thereof.

27. The method according to claim 26, wherein the ceramic which resists oxidation is selected from SiC and composite SiC ceramics.

28. The method according to claim 1, wherein the refractory metal is selected from Ti, Cr, Nb, V, Ta, Ir, Mo, Hf, Zr, Pt, Re; alloys thereof; and mixtures of these metals and/or alloys.

29. The method according to claim 1, wherein the layer made of a refractory metal has a thickness from 1 nm to 1,000 µm.

30. The method according to claim 1, wherein, during step b), the powder is deposited with a method selected from plasma spraying, methods using a suspension of the powder or a slurry, and the simple putting into contact of the powder via a dry route.

31. The method according to claim 1, wherein the part is cooled at a rate from 5° C. to 600° C./minute, down to room temperature.

32. The method according to claim 1, wherein the pressure and the temperature are gradually raised from room temperature and from a pressure of 0 MPa.

33. The method according to claim 32, wherein the temperature is raised by carrying out a ramp, or several ramps optionally having different slopes, in order to reach the sintering temperature.

34. The method according to claim 32, wherein the pressure is raised by carrying out a ramp, or several ramps optionally having different slopes, in order to reach the sintering pressure.

35. The method according to claim 32, wherein the temperature and pressure are raised simultaneously within a same period of time.

36. The method according to claim 1, wherein the protective refractory monolayer coating against oxidation has a thickness from 4 nm to 1,000 µm.

* * * * *